(12) United States Patent
Kou et al.

(10) Patent No.: US 10,730,967 B2
(45) Date of Patent: Aug. 4, 2020

(54) POLYMER COMPOSITIONS AND USE OF THESE POLYMER COMPOSITIONS AS VISCOSITY MODIFIERS

(71) Applicant: BASF SE, Ludwigshafen (DE)

(72) Inventors: Huiguang Kou, Viernheim (DE); Clemens Auschra, Freiburg (DE); Dario Perera-Diez, Basel (CH)

(73) Assignee: BASF SE, Ludwigshafen (DE)

( * ) Notice: Subject to any disclaimer, the term of this patent is extended or adjusted under 35 U.S.C. 154(b) by 165 days.

(21) Appl. No.: 15/536,525

(22) PCT Filed: Dec. 15, 2015

(86) PCT No.: PCT/EP2015/079738
§ 371 (c)(1),
(2) Date: Jun. 15, 2017

(87) PCT Pub. No.: WO2016/096816
PCT Pub. Date: Jun. 23, 2016

(65) Prior Publication Data
US 2017/0362351 A1  Dec. 21, 2017

(30) Foreign Application Priority Data
Dec. 16, 2014  (EP) ..................... 14198313

(51) Int. Cl.
| | |
|---|---|
| *C09D 7/43* | (2018.01) |
| *C08G 65/333* | (2006.01) |
| *C08G 65/332* | (2006.01) |
| *C08F 8/14* | (2006.01) |
| *C09D 5/02* | (2006.01) |
| *C09D 133/08* | (2006.01) |
| *C08G 63/672* | (2006.01) |
| *C08G 63/685* | (2006.01) |
| *C08G 63/91* | (2006.01) |
| *C08G 65/329* | (2006.01) |
| *C09D 7/45* | (2018.01) |

(52) U.S. Cl.
CPC .............. *C08F 8/14* (2013.01); *C08G 63/672* (2013.01); *C08G 63/6856* (2013.01); *C08G 63/916* (2013.01); *C08G 65/329* (2013.01); *C08G 65/3326* (2013.01); *C08G 65/33344* (2013.01); *C09D 5/027* (2013.01); *C09D 7/43* (2018.01); *C09D 7/45* (2018.01); *C09D 133/08* (2013.01)

(58) Field of Classification Search
CPC .. C08F 8/14; C09D 7/43; C09D 5/027; C08G 65/3326; C08G 65/33313; C08G 65/33344; C08G 65/33396
See application file for complete search history.

(56) References Cited

U.S. PATENT DOCUMENTS

| | | | |
|---|---|---|---|
| 4,079,028 | A | 3/1978 | Emmons et al. |
| 4,155,892 | A | 5/1979 | Emmons et al. |
| 4,180,644 | A | 12/1979 | Marquis et al. |
| 4,191,706 | A | 3/1980 | Marquis et al. |
| 4,191,835 | A | 3/1980 | Habermeier et al. |

(Continued)

FOREIGN PATENT DOCUMENTS

| | | |
|---|---|---|
| DE | 40 03 422 A1 | 8/1991 |
| DE | 196 24 299 A1 | 1/1997 |

(Continued)

OTHER PUBLICATIONS

International Search Report dated Feb. 15, 2016 in PCT/EP2015/079738 filed Dec. 15, 2015.

*Primary Examiner* — Vu A Nguyen
(74) *Attorney, Agent, or Firm* — Oblon, McClelland, Maier & Neustadt, L.L.P.

(57) ABSTRACT

The present invention relates to novel polymer compositions, to a process for their manufacturing, to the use of said polymer compositions for modifying the viscosity of aqueous compositions, and to water-borne coating compositions containing the novel polymer compositions as thickeners. The polymer compositions comprise a polymer material which is obtainable by reacting: a) a polymer P1 having at least one functional group of the formula (I), where k is an integer from 0 to 4; n is 0 or 1 p is an integer from 1 to 10, the number average of p being from 1.5 to 10; Q is a divalent moiety selected from the group consisting of —O— and —NH—; P is a p-valent hydrophilic neutral polymer radical; and $R^1$ is as defined in the claims; with b) a succinic anhydride of the formula (II) where R is $C_4$-$C_{24}$-alkyl or $C_4$-$C_{24}$-alkenyl.

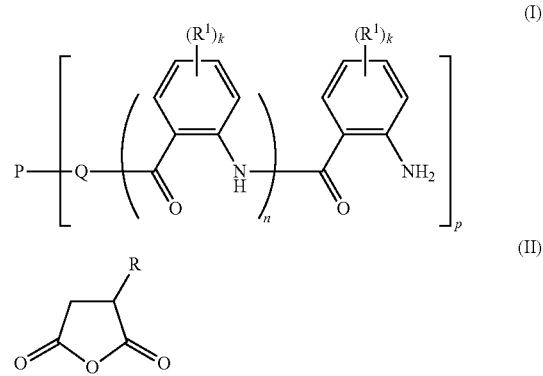

19 Claims, No Drawings

(56) References Cited

U.S. PATENT DOCUMENTS

| | | |
|---|---|---|
| 4,247,677 A | 1/1981 | Schmidt et al. |
| 4,260,729 A | 4/1981 | Schmidt et al. |
| 4,426,485 A | 1/1984 | Hoy et al. |
| 4,581,464 A | 4/1986 | Ross et al. |
| 5,231,149 A | 7/1993 | Longley et al. |
| 5,574,127 A | 12/1996 | Sau |
| 9,670,350 B2 | 6/2017 | Kou et al. |
| 2003/0212291 A1 | 11/2003 | Gajewski et al. |
| 2004/0007153 A1 | 1/2004 | Thetford et al. |
| 2010/0298185 A1 | 11/2010 | Gieselman et al. |
| 2015/0038640 A1 | 2/2015 | Kou et al. |
| 2016/0145381 A1 | 5/2016 | Kou et al. |

FOREIGN PATENT DOCUMENTS

| | | | |
|---|---|---|---|
| DE | 196 21 027 A1 | 11/1997 | |
| DE | 197 41 184 A1 | 3/1999 | |
| DE | 19741187 A1 | 3/1999 | |
| DE | 198 05 122 A1 | 4/1999 | |
| DE | 198 28 183 A1 | 12/1999 | |
| DE | 198 39 199 A1 | 3/2000 | |
| DE | 198 40 586 A1 | 3/2000 | |
| DE | 198 47 115 C1 | 5/2000 | |
| EP | 0 021 569 A1 | 1/1981 | |
| EP | 0 771 328 A1 | 5/1997 | |
| EP | 1 228 118 A1 | 8/2002 | |
| WO | WO 02/38645 A1 | 5/2002 | |
| WO | WO-0238645 A1 * | 5/2002 | ......... C08G 18/4252 |
| WO | WO 2009/064685 A2 | 5/2009 | |
| WO | WO-2009064685 A2 * | 5/2009 | .......... C10M 133/56 |
| WO | WO 2013/124830 A1 | 8/2013 | |
| WO | WO-2013124830 A1 * | 8/2013 | ................ C08F 2/00 |
| WO | WO 2015/011085 A1 | 1/2015 | |
| WO | WO-2015011085 A1 * | 1/2015 | ............. C08F 20/18 |
| WO | WO 2016/071386 A1 | 5/2016 | |
| WO | WO 2016/096816 A1 | 6/2016 | |

* cited by examiner

POLYMER COMPOSITIONS AND USE OF THESE POLYMER COMPOSITIONS AS VISCOSITY MODIFIERS

This application is a National Stage of PCT/EP2015/079738, which was filed on Dec. 15, 2015. This application is based upon and claims the benefit of priority to European Application No. 14198313.0, which was filed on Dec. 16, 2014.

The present invention relates to novel polymer compositions, to a process for their manufacturing, to the use of said polymer compositions for modifying the viscosity of aqueous compositions, and to water-borne coating compositions containing the novel polymer compositions as thickeners. The novel polymer compositions may be regarded to belong to the class of so called associative thickeners.

Viscosity modifiers or thickeners are typically understood in the art to be certain water-soluble or water-swellable polymers that are widely used as additives in many industrial water-borne systems in order to modify their flow behavior. Thickeners increase and maintain viscosity at required levels under specified processing conditions and end use situations. Thickeners are useful, for example, in decorative and protective coatings, paper coatings, cosmetics and personal care items, detergents, pharmaceuticals, adhesives and sealants, agricultural formulations, and petroleum drilling fluids.

Thickeners can be materials that are either naturally occurring or synthetically manufactured. Associative thickeners are a relatively new class of synthetically manufactured thickeners that have gained commercial importance as they have been shown to lead to improved applications properties. The term "associative thickener" is recognized in the art to typically mean a non-ionic hydrophobically modified water-soluble polymer capable of interacting in aqueous solution with itself and with other species such as dispersed-phase particles of an aqueous dispersion. This way they may form a three-dimensional network within an aqueous dispersion such as a polymer latex. Associative thickeners are widely applied to enhance the performance properties of paints and coatings. The use of associative thickeners in water based compositions is described in a number of patents, including U.S. Pat. Nos. 5,574,127; 4,426,485; 4,155,892 and 4,079,028.

There is still a growing need for thickeners which enhance the rheological behaviour especially of water-borne coating compositions and in this way effect improved application properties such as better flowability and levelling, less spattering and sagging as well as higher gloss of the formed coatings. Said enhanced rheological behaviour is in particular characterized by suitable viscosities over a wide range of shear rates.

WO 02/38645 relates to addition reaction products of a polyisocyanate with a functionality of from 2 to 10 and a succinyl polyether having a $C_{6-30}$-alk(en)yl group and at east one group which is capable of reacting with isocyanate. WO 02/38645 also relates to the use of such addition reaction products as associative thickeners in aqueous systems.

EP 1 228 118 relates the polyesters derived from polyethyleneglycols and alk(en)ylsuccinic anhydrides and their use as associative thickeners in aqueous formulations.

Polymers having pending anthranilate or anthranilamide groups, which may be attached directly or via a bivalent spacer to the polymer backbone or to the termini of the polymers have been described several times as crosslinkers or chain extenders for polyurethanes or epoxys, e.g. from the following patent documents:

Anthranilate functionalized poly(alkylene oxide)s are e.g. known from U.S. Pat. Nos. 4,180,644, 4,191,706, 4,191,835, 4,247,677, 4,260,729 and US 2003212291. Anthranilate functionalized poly(alkylene oxide)s are used as a crosslinker agent for polyurethane or epoxy coatings.

Anthranilate functionalized polyesters are e.g. known from EP 21569. They are used as a chain extender in the production of polyureas and polyurea-polyurethanes.

Anthranilate functionalized polycarbonates are e.g. known from U.S. Pat. No. 5,231,149. They are used for the production of graft or block copolymers having improved impact and solvent resistance.

WO 2013/124830 describes the use of polymers having at least one pending anthranilate or anthranilamide group as dispersants for pigments in water-borne or solvent borne coating compositions.

PCT/EP2014/065606 describes polymers having at least one anthranilate or anthranilamide group, which carry a group —(C═O)—X—COY at the anthranilamide nitrogen, wherein X is a divalent moiety selected from the group consisting of optionally substituted linear $C_1$-$C_{10}$-alkylene, linear $C_2$-$C_6$-alkenylene, $C_4$-$C_7$-cycloalkylene, arylene and alkarylene and wherein Y is OH or an anthranilamide type radical.

It has now been found that a polymer composition, which is obtainable by the reaction of a polymer P1 of the formula (I), as defined hereinafter, having at least one pending anthranilate or anthranilamide moiety that is bound to one of the termini and/or to the polymer backbone P of the polymer P1, with at least one $C_4$-$C_{24}$-alk(en)ylated succinic anhydride, in particular a linear $C_6$-$C_{18}$-alk(en)ylated succinic anhydride, has beneficial properties as viscosity modifier for aqueous compositions, and, in particular, imparts superior rheology behaviour to water-borne coating compositions and, thus, improved surface coatings.

Therefore, the present invention relates to a polymer composition comprising a polymer material which is obtainable by reacting a) a polymer P1 of the formula (I)

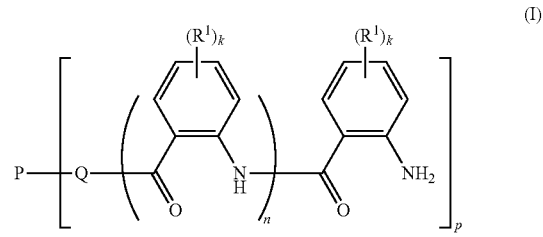

where k is an integer from 0 to 4;

n is 0 or 1;

p is an integer from 1 to 10, the number average of p being from 1.5 to 10;

Q is a divalent moiety selected from the group consisting of —O— and —NH—;

P is a p-valent hydrophilic neutral polymer radical;

$R^1$ is independently selected from the group consisting of halogen, $COOCH_3$, —$N(C_1$-$C_6$-alkyl$)_2$, —$NO_2$, —$S(═O)_2R^2$, $C_1$-$C_4$-alkyl, $C_1$-$C_4$-alkoxy, aryloxy, aryl, heteroaryl, where aryl, hetaryl and aryloxy are unsubstituted or substituted by 1, 2, 3 or 4 radicals selected from the group consisting of —OH, —COOCH$_3$, —N(C$_1$-C$_6$-alkyl)$_2$, —NO$_2$, —S(=O)$_2$R$^2$, C$_1$-C$_4$-alkyl, C$_1$-C$_4$-alkoxy and halogen;

R$^2$ is selected from the group consisting of —NH$_2$, —NH(C$_1$-C$_6$-alkyl), —N(C$_1$-C$_6$-alkyl)$_2$, C$_1$-C$_4$-alkyl, C$_1$-C$_4$-alkoxy, aryl and heteroaryl, where aryl and hetaryl are unsubstituted or substituted by 1, 2, 3 or 4 radicals selected from the group consisting of C$_1$-C$_4$-alkyl, C$_1$-C$_4$-alkoxy and halogen;

with b) a succinic anhydride of the formula (II)

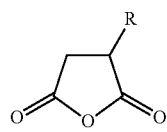
(II)

where R is C$_4$-C$_{24}$-alkyl or C$_4$-C$_{24}$-alkenyl.

The present invention also relates to polymer compositions that besides the polymer material obtained from the reaction of polymer P1 with a succinic anhydride of the formula (II) also comprise a non-ionic surfactant, which is preferably selected from ethoxylates of C$_6$-C$_{20}$-alkanols.

The present invention in addition relates to a process for preparing the polymer P1, which process comprises the reaction of a polymer P-(Q-H)$_p$ (formula (III)), wherein the variables P, Q and p have the aforementioned meanings, with isatoic anhydride, anthranilic acid anhydride, anthranilic acid esters or respective derivatives thereof.

The present invention further relates to a process for the manufacturing of the polymer composition, which comprises reacting the polymer P1 with a succinic anhydride of the formula (II) with the substituent R preferably being a linear C$_6$-C$_{18}$-alk(en)yl group.

The polymer material contained in the polymer compositions of the present invention, as well as their salts, act as a viscosity modifier in aqueous compositions, i.e. they can be used to increase and/or maintain the viscosity at levels appropriate for the desired applications. The polymer material is in particular suitable as thickener for water-based coating compositions, such as those based on polymer latices, providing for improved rheological behaviour of the coating compositions which results in ease of use and high quality coatings. This beneficial effect of the polymer compositions of the present invention can be achieved for a large variety of aqueous coating compositions and is also available over a wide range of shear rates. Moreover, the polymer material of the polymer compositions can be accurately tailored to certain coating compositions or certain application needs by altering the number p of the anthranilate and/or anthranilamide moieties or by modifying the polarity and/or the structure of the polymer backbone P or the substituent R introduced via the succinic anhydride of formula (II).

The aforementioned enhanced rheological behaviour of water-borne coating compositions containing the polymer composition of the invention as thickeners is reflected in improved flowability and levelling, reduced spattering and sagging of the coating compositions. The polymer compositions of the present invention also improve the quality and especially the gloss of the coatings obtained from water-borne coating compositions containing the polymer composition of the invention.

Therefore, the polymer composition of the present invention is useful as viscosity modifier in aqueous compositions and especially as thickener in water-borne coating compositions containing a polymer latex. For these purposes the polymer composition is preferably used in the form of an aqueous solution of the polymer material.

The present invention thus also relates to water-borne coating compositions which, besides the polymer compositions of the present invention, comprise a polymer P2 in the form of a polymer latex, such as a acrylate latex, and in addition at least one fine particulate solid material selected from pigments and fillers, wherein the fine particulate solid material is dispersed in the aqueous phase.

Here and in the following, generic terms such as alkyl, cycloalkyl, alkylene, alkenylene, cycloalkylene or halogen for the variables defining the formula I are used. These variables have to be understood as a list of individual radicals which are representatives of the generic term.

In this context, the term C$_n$-C$_m$ indicates the possible number of carbon atoms, which the individual members of the generic terms may have.

In this context, the term "halogen" has to be understood as a halogen radical, which is generally selected from fluorine, chlorine, bromine or iodine, in particular from fluorine or chlorine.

The term "alkyl" as used herein and the alkyl parts of —NH(C$_1$-C$_6$-alkyl) and —N(C$_1$-C$_6$-alkyl)$_2$ in each case denote a saturated hydrocarbon radical which may be linear or branched and which generally has from 1 to 6 carbon atoms (C$_1$-C$_6$-alkyl) and which preferably has from 1 to 4 carbon atoms (C$_1$-C$_4$-alkyl). Examples of C$_1$-C$_4$-alkyl are methyl, ethyl, n-propyl, iso-propyl, n-butyl, 2-butyl (sec-butyl), isobutyl and tert-butyl. Examples for C$_1$-C$_6$-alkyl are, apart those mentioned for C$_1$-C$_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methyl propyl and 1-ethyl-2-methylpropyl. Examples for C$_1$-C$_{24}$-alkyl are, apart those mentioned for C$_1$-C$_6$-alkyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, n-octyl, 1-methyloctyl, 2-methylheptyl, 1-ethylhexyl, 2-ethylhexyl, 1,2-dimethylhexyl, 1-propylpentyl, 2-propylpentyl, nonyl, decyl, 2-propylheptyl, 3-propylheptyl, linear undecyl and its branched isomers, lauryl and its branched isomers, linear tridecyl and its branched isomers, myristyl and its branched isomers, palmityl and its branched isomers, stearyl and its branched isomers, eicosenyl and behenyl and its branched isomers.

The term "alkylene" (or alkanediyl) as used herein and in —O—(C$_2$-C$_6$-alkylene), —C(=O)—O—(C$_2$-C$_6$-alkylene), —NR$^3$—(C$_2$-C$_6$-alkylene) and C(=O)—NR$^3$—(C$_2$-C$_6$-alkylene), in each case denotes an alkyl radical as defined above, wherein one hydrogen atom at any position of the carbon backbone is replaced by one further binding site, thus forming a bivalent moiety. Preferred alkylene has 2 to 6 carbon atoms, in particular 2 to 4 carbon atoms. Preferably, the two binding sites of the bivalent moiety C$_2$-C$_6$-alkylene or C$_2$-C$_4$-alkylene, respectively, are not at the same carbon atom. Examples of alkylene include methylene, 1,2-ethandiyl (=CH$_2$CH$_2$), 1,2-propandiyl (=CH(CH$_3$)CH$_2$), 1,3-propandiyl (=CH$_2$CH$_2$CH$_2$), 1-methyl-1,3-propandiyl (=CH(CH$_3$)CH$_2$CH$_2$), 2-methyl-1,3-propandiyl (=CH$_2$CH(CH$_3$)CH$_2$), 1-methyl-1,2-propandiyl (=C(CH$_3$)$_2$CH$_2$), 1,4-butandiyl (=CH$_2$CH$_2$CH$_2$CH$_2$), 2,2-dimethyl-1,3-propandiyl (=CH$_2$C(CH$_3$)$_2$CH$_2$), etc.

The term "linear alkylene" (or linear alkanediyl) as used herein denotes in each case a linear alkyl radical, wherein one hydrogen at the end of the linear carbon backbone is replaced by a further binding site. Preferred linear alkylene has 1 to 10 carbon atoms, in particular 2 to 6 carbon atoms. Examples of linear alkylene include methanediyl (=CH$_2$), 1,2-ethandiyl (=CH$_2$CH$_2$), 1,3-propandiyl (=CH$_2$CH$_2$CH$_2$), 1,4-butandiyl (=CH$_2$CH$_2$CH$_2$CH$_2$), etc.

The term "cycloalkyl" as used herein (and in the cycloalkyl moieties of other groups comprising a cycloalkyl group, e.g. cycloalkoxy and cycloalkylalkyl) denotes in each case a mono- or bicyclic cycloaliphatic radical having usually from 3 to 10 carbon atoms ("$C_3$-$C_{10}$-cycloalkyl"), preferably 3 to 8 carbon atoms ("$C_3$-$C_8$-cycloalkyl") or in particular 3 to 6 carbon atoms ("$C_3$-$C_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 or 8 carbon atoms comprise bicyclo[2.1.1]hexyl, bicyclo[2.2.1]heptyl, bicyclo[3.1.1]heptyl, bicyclo[2.2.1]heptyl, bicyclo[2.2.2]octyl and bicyclo[3.2.1]octyl.

The term "alkoxy" as used herein denotes in each case a straight-chain or branched alkyl group usually having from 1 to 4 carbon atoms ("$C_1$-$C_4$-alkoxy"), which is bound to the remainder of the molecule via an oxygen atom. $C_1$-$C_2$-Alkoxy is methoxy or ethoxy. $C_1$-$C_4$-Alkoxy is additionally, for example, n-propoxy, 1-methylethoxy (isopropoxy), butoxy, 1-methylpropoxy (sec-butoxy), 2-methylpropoxy (isobutoxy) or 1,1-dimethylethoxy (tert-butoxy).

The term "haloalkyl" as used herein denotes in each case an alkyl radical as defined above having 1 to 4 carbon atoms ("$C_1$-$C_4$-haloalkyl"), in particular 1 to 2 carbon atoms, wherein at least one of the hydrogen atoms of the alkyl group has been replaced by same or different halogen atoms, preferably by chloro or fluoro, in particular by fluoro. Examples of $C_1$-$C_4$-haloalkyl include but are not limited to monofluoro-, difluoro- or trifluoro-methyl, -ethyl or -propyl, for example 3,3,3-trifluoropropyl, 2-fluoroethyl, 2,2,2-trifluoroethyl, fluoromethyl, or trifluoromethyl.

The term "aryl" as used herein (and the aryl moiety in aryl-$C_1$-$C_4$-alkyl and aryloxy) in each case denotes a mono-, bi- or tricyclic hydrocarbon radical comprising at least one phenyl ring, to which one or two further saturated or unsaturated 5- or 6-membered hydrocarbon rings may be fused. Examples of aryl include phenyl, naphthyl, indanyl, indenyl, 1,2,3,4-tetrahydro-5-naphtyl, 1,2,3,4-tetrahydro-6-naphtyl, anthracenyl, 9,10-dihydroanthracen-1-yl and 9,10-dihydroanthracen-2-yl.

The term "heteroaryl" as used herein (and the heteroaryl moiety in heteroaryl-$C_1$-$C_4$-alkyl) in each case denotes a mono-, bi- or tricyclic heterocyclic radical comprising at least one aromatic 5- or 6-membered heterocyclic radical having 1, 2, 3 or heteroatoms selected from N, O and S as ring members, to which one or two further saturated or unsaturated 5- or 6-membered hydrocarbon rings or heterocyclic rings having 1, 2, 3 or heteroatoms selected from N, O and S as ring members may be fused. Examples of 5- or 6-membered heterocyclic radicals (monocyclic heteroaryl), include furyl, thienyl, pyrrolyl, imidazolyl, pyrazolyl, triazolyl, oxazolyl, thiazolyl, isoxazolyl, isothiazolyl, pyridyl, pyrimidinyl, pyrazinyl, pyridazinyl and triazinyl. Examples of 5- or 6-membered heterocyclic radicals to which one or two further saturated or unsaturated 5- or 6-membered hydrocarbon rings or heterocyclic rings having 1, 2, 3 or heteroatoms selected from N, O and S as ring members are fused (bi and tricyclic heteroaryl), include, quinolinyl, quinazolinyl, quinoxalinyl, benzofuryl, benzothienyl, indolyl, indazolyl, benzimidazoly, benzoxazolyl, benzoisoxazolyl, benzoisothiazolyl, etc.

The term "aryloxy" denotes an aryl radical as defined herein, which is bound to the remainder via an oxygen atom.

The polymer P1 used for obtaining the polymer composition of the present invention is employed in its non-ionic form or in the form of one of its salts. Suitable salts of the polymer P1 include alkylammonium salts such as monoalkylammonium salts, for example ethylammonium, dialkylammonium salts, for example diisopropylammonium, trialkylammonium salts, for example triethylammonium, diisopropylethylammonium or tributylammonium, as well as alkanolammonium salts such as monoalkanolammonium salts, for example ethanolammonium or 2-ammonium-2-methyl-1-propanol, N,N-dialkylalkanolammonium salts, for example N, N-dimethylethanolammonium or N,N-dimethylammoniumethylpropanol, dialkanolammonium salts, for example diethanolammonium and trialkanolammonium salts, for example triethanolammonium. Suitable salts of the polymer P1 also include alkali metal or alkaline earth metal salts, for example sodium, potassium, lithium or calcium salts, and ammonium salts.

According to a preferred embodiment of the present invention the polymer P1 used for obtaining the polymer composition according to the invention is employed in its non-ionic form.

The remarks made below as to preferred embodiments of the variables (substituents) of the moieties of formulae (I), (II), (III), (IVa) and (IVb) are valid on their own as well as preferably in combination with each other. It is clear to a skilled person that for k being 2, 3 or 4, the substituent radical $R^1$ may be identical or different. It is also clear to a skilled person that for n=1 the meanings k, $R^1$ and $R^2$ in each repeating unit may be identical or different, generally, they will be identical.

The remarks made below concerning preferred embodiments of the functional groups of the polymers P1 according to the formula (I) are valid on their own as well as preferably in combination with each other concerning the polymers P1 as well as the polymer materials and polymer compositions obtained therefrom.

In particular the variables k, n, Q, $R^1$, $R^2$ and R alone or in combination have preferably the following meanings k is 0, 1 or 2, in particular 0 or 1, especially 0;
n is 0 or 1, in particular 0;
Q is a divalent moiety selected from the group consisting of —O— and —NH—, in particular —O—;
$R^1$ if present, is independently selected from the group consisting of halogen, —COOCH$_3$, —N($C_1$-$C_6$-alkyl)$_2$, —NO$_2$, —S(=O)$_2R^2$, $C_1$-$C_4$-alkyl, $C_1$-$C_4$-alkoxy, phenyl and pyridyl, where the last two radicals are unsubstituted or carry a radical selected from halogen, $C_1$-$C_4$-alkyl and $C_1$-$C_4$-alkoxy;
$R^2$ if present, is selected from the group consisting of —NH$_2$, —NH($C_1$-$C_6$-alkyl), —N($C_1$-$C_6$-alkyl)$_2$ and $C_1$-$C_4$-alkyl; and
R is linear $C_4$-$C_{24}$-alkyl or linear $C_4$-$C_{24}$-alkenyl, in particular linear $C_6$-$C_{18}$-alkyl or linear $C_6$-$C_{18}$-alkenyl and especially linear $C_6$-$C_{14}$-alkyl or linear $C_6$-$C_{14}$-alkenyl.

In an even more preferred embodiment, the variables k and n are both 0 and Q is —O—.

The variable p in the formula (I) is an integer of from 1 to 10, i.e. the polymers P1 of the present invention have 1 to 10 pending anthranilate and/or anthranilamide group(s) as depicted in formula (I). Preferably, p is an integer of from 1 to 6 or 1 to 4, and in particular is 1, 2 or 3. The number average of the variable p is 1.5 to 10, preferably 1.5 to 5, in particular 1.5 to 3.5 and especially 1.8 to 3. The p pending anthranilate and/or anthranilamide group(s) of the polymers P1 according to formula (I) may be bound either to one or more of the termini of polymer P-(Q-H)$_p$, i.e. the polymer constituting the backbone of polymer P1, or at any other position of polymer P. In a particular embodiment p is 1, 2 or 3, i.e. the polymer P1 has 1, 2 or 3 pending anthranilate and/or anthranilamide group(s) as depicted in formula (I).

Frequently, the polymer backbone P of the polymer P1 is selected from the group consisting of polyethers, in particular poly-$C_2$-$C_4$-alkylene oxides, and polyetheresters, in particular aliphatic polyetheresters having at least one aliphatic polyester block and at least one aliphatic polyether block such as a poly-$C_2$-$C_6$-alkylene oxide moiety.

The polymer radical P which is selected from polyethers and polyetheresters, as mentioned before, is modified in that it carries 1 to 10 pending anthranilate and/or anthranilamide group(s) as depicted in formula (I), e.g. the variable p in the formula (I) is an integer of from 1 to 10, in particular from 1 to 8 or 1 to 6 or 1 to 4, and especially is 1, 2 or 3. The pending anthranilate and/or anthranilamide group(s) may be bound either to one or more of the termini of the polymer radical P or at any other position of P. Preferably the functional groups of the formula (I) are located at the termini of polymer radical P.

The term "aliphatic polyether" is understood as a polyether, where the majority of the carbon atoms in the repeating units, in particular at least 90% of the carbon atoms of the repeating units in the polymer backbone are present as alkylene units, in particular $C_2$-$C_4$-alkylene units, which are linked by oxygen atoms, where the alkylene units may carry a hydroxyl group. In particular the polymer backbone of aliphatic polyethers does not contain aromatic rings, such as phenyl.

In addition to the alkylene units, in particular $C_2$-$C_4$-alkylene units, which are linked by oxygen atoms, the aliphatic polyethers may have one or more hydrocarbon groups, e.g. alkyl, cycloalkyl or cycloalkyl-alkyl groups, such as $C_1$-$C_{30}$-alkyl groups, $C_5$-$C_{10}$-cycloalkyl groups or $C_5$-$C_{10}$-cycloalkyl-$C_1$-$C_4$-alkyl groups. These hydrocarbon groups may be located at the termini of the aliphatic polyether chain or may be part of the backbone.

The aliphatic polyethers are linear or star-shaped. In this context, the term "linear" means that the aliphatic polyether has no or essentially no branching units and thus, the number of termini of the polymer backbone is 2. The term star-shaped means that the aliphatic polyether backbone has at least one branching site and thus has at least 3, e.g. from 3 to 10, termini.

The term "aliphatic polyetheresters" is understood as a block polyether-co-polyester having both at least one, e.g. 1, 2, 3 or 4 polyether block(s) and at least one, e.g. 1, 2, 3 or 4 polyester block(s). The weight ratio of the polyester blocks and the polyether blocks is usually in the range from 1:100 to 100:1, in particular in the range from 1:10 to 10:1. The majority of the carbon atoms in the polyester blocks, in particular at least 90% of the carbon atoms of the repeating units in the polyester blocks are present as alkylene units and carbonyl groups, in particular $C_2$-$C_6$-alkylene units and carbonyl groups, while the carbon atoms in the polyether blocks are present as alkylene units, in particular $C_2$-$C_6$-alkylene units or $C_2$-$C_3$-alkylene units. The alkylene units in both the aliphatic polyester blocks and the polyester blocks of the aliphatic polyetheresters may carry a hydroxyl group.

In particular, the polymer backbone of aliphatic polyetheresters does not contain aromatic rings such as phenyl. According to a particular embodiment of the invention the aliphatic polyetheresters have exactly one polyether block and exactly one polyester block.

With regard to their capability of acting as a viscosity modifier for aqueous compositions and in particular as a thickener in water-borne coating compositions, preference is given to polymer compositions wherein the polymer radicals P that are included in the polymers P1 have a number average molecular weight $M_N$ in the range from 500 to 50000 Dalton, preferably from 1000 to 30000 Dalton, more preferably from 5000 to 20000 Dalton, in particular from 5000 to 15000 Dalton, and especially from 5000 to 10000 Dalton. The weight average molecular weight $M_W$ of the polymer radicals P is generally in the range from 320 to 100000 Dalton, preferably from 450 to 80000 Dalton, more preferably from 500 to 50000 Dalton, in particular from 1500 to 50000 Dalton, especially from 4000 to 50000 Dalton. The polydispersity $M_W/M_N$ of the polymer radicals P included in the polymers P1 of the polymer compositions according to the present invention is generally in the range from 1.05 to 5, preferably from 1.1 to 4 and especially from 1.2 to 3.

With regard to their capability of acting as a viscosity modifier for aqueous compositions and in particular as a thickener in water-borne coating compositions, preference is given to polymers P1 used for obtaining the polymer compositions of the present invention, which in addition to the functional moieties of the formulae (IVa) or (IVb), as defined herein below, have one or more poly($C_2$-$C_4$-alkyleneoxide) radicals which may be located in the polymer backbone P or grafted onto the polymer backbone P. In these poly-($C_2$-$C_4$-alkyleneoxide) radicals, the $C_2$-$C_4$-alkyleneoxide repeating units preferably comprise at least 50% by weight ethyleneoxide repeating units. In particular, the poly-($C_2$-$C_4$-alkyleneoxide) radicals are polyethyleneoxide radicals. The number average weight of the poly($C_2$-$C_4$-alkyleneoxide) radicals will generally be in the range from 150 to 5000 Dalton, in particular from 200 to 3000 Dalton. The poly($C_2$-$C_4$-alkyleneoxide) radicals may carry a terminal OH group or may be "endcapped", i.e. the hydrogen atom of the terminal OH group is replaced by a hydrocarbon radical, such as $C_1$-$C_{30}$-alkyl, benzyl, $C_5$-$C_{10}$-cycloalkyl or $C_5$-$C_{10}$-cycloalkyl-$C_1$-$C_4$-alkyl, especially by a $C_1$-$C_{20}$-alkyl.

In a particular preferred embodiment of the invention the polymer radical P, i.e. the polymer backbone of polymer P1, is an aliphatic polyether, in particular a poly($C_2$-$C_4$-alkylene oxide), especially a poly(ethylene oxide), a poly(propylene oxide) or a poly(ethylene oxide-co-propylene oxide), where in the latter the ethylene oxide and propylene oxide repeating units may be arranged randomly or blockwise. The poly-($C_2$-$C_4$-alkylene oxide) carries p=1 to 10 or 1 to 6 or 1 to 4, in particular p=1, 2 or 3 anthranilate and/or anthranilamide group(s) as depicted in formula (I). According to this embodiment the anthranilate and/or anthranilamide group(s) are attached to the termini and/or the polymer backbone of the poly-($C_2$-$C_4$-alkylene oxide), the variable Q is —O— or —NH—.

In a further particular embodiment of the invention, polymers P1 are used, wherein the polymer backbone P is an aliphatic polyetherester, in particular a linear or branched or hyperbranched aliphatic polyetherester, selected from a) aliphatic polyetheresters, where the majority, in particular at least 70% of repeating units are units of the polyester blocks are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise; and b) aliphatic polyetheresters, where the majority, in particular at least 70% of repeating units are units of the polyester blocks are derived from one or more, e.g. 1, 2, or 3 aliphatic $C_4$-$C_{10}$ lactones, or a combination thereof with one or more, e.g. 1, 2 or 3 further components, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

The weight ratio of the polyester blocks and the polyether blocks is usually in the range from 1:100 to 100:1 in particular in the range from 1:10 to 10:1.

With regard to polyetheresters, examples of aliphatic $C_2$-$C_{10}$-dicarboxylic acids include malonic acid, succinic acid, glutaric acid, 2-methylglutaric acid, 3-methylglutaric acid, adipic acid, pimelic acid, azelaic acid, sebacic acid, 2,2-dimethylglutaric acid, suberic acid and diglycolic acid.

Examples of $C_2$-$C_{10}$ aliphatic diols include ethylene glycol, 1,2-propanediol, 1,3-propanediol, 1,2-butanediol, 1,4-butanediol, 1,5-pentanediol, 2,4-dimethyl-2-ethylhexane-1, 3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, diethylene glycol and triethylene glycol.

Examples of $C_3$-$C_{10}$ aliphatic or $C_5$-$C_{10}$-cycloaliphatic polyols having 3, 4, 5 or 6 hydroxyl groups include glycerol, trimethylolpropane, trimethylolethane, pentaerythritol, sorbitol, innositol, pentahydroxycyclopentane, hexahydroxycyclohexane, etc.

Examples of $C_4$-$C_{10}$-lactones include, γ-butyrolactone, γ-valerolactone, δ-valerolactone, ε-caprolactone.

In yet a further particular preferred embodiment of the invention the polymer radical P, i.e. the polymer backbone of polymer P1, is selected from aliphatic polyetheresters, where in the at least one polyester block the majority, in particular at least 70% of repeating units of the polyester block are derived from aliphatic $C_4$-$C_{10}$-lactones, in particular from γ-valerolactone, δ-valerolactone, ε-caprolactone or a mixture thereof and where the at least one aliphatic polyether block is as defined above, and where the polyether blocks are preferably poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise. The weight ratio of the polyester blocks and the polyether blocks of the polyetheresters of this particular embodiment is usually in the range from 1:100 to 100:1 in particular in the range from 1:10 to 10:1. The aliphatic polyetheresters may be linear or branched or hyperbranched.

The polymer composition according to the present invention is obtainable by reacting a polymer P1 with a succinic anhydride of the formula (II)

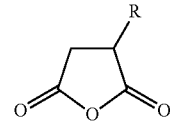

(II)

where R is selected from $C_4$-$C_{24}$-alkyl and $C_4$-$C_{24}$-alkenyl, preferably from linear $C_4$-$C_{24}$-alkyl and linear $C_4$-$C_{24}$-alkenyl, in particular from linear $C_6$-$C_{18}$-alkyl and linear $C_6$-$C_{18}$-alkenyl and especially from linear $C_6$-$C_{14}$-alkyl and linear $C_6$-$C_{14}$-alkenyl.

Accordingly the present invention also relates to a process for the manufacturing of polymer composition of the invention, which process comprises the steps:

a) providing a polymer P1, and b) reacting the polymer P1 obtained in step a) with succinic anhydride of the formula (II), wherein the variable R in formula (II) is as herein defined and in particular has the meanings mentioned herein as preferred.

The polymer P1 and the succinic anhydride of the formula (II) are reacted in a relative amount such that the molar ratio of —$NH_2$ groups in the polymer P1 to the anhydride groups of the succinic anhydride of formula (II) is preferably in the range from 1.5:1 to 1:10, in particular from 1:1 to 1:5, and especially 1:1.2 to 1:3. Said —$NH_2$ groups in the polymer P1 are the —$NH_2$ groups of the pending anthranilate or anthranilamide moieties. Accordingly, preference is given to those polymer compositions that are obtained by reacting the polymer P1 and the succinic anhydride of the formula (II) in such a way that the molar ratio of —$NH_2$ groups in the polymer P1 to the anhydride groups of the succinic anhydride of formula (II) is within the aforementioned preferred ranges.

The reaction of the polymer P1 with the succinic anhydride of the formula (II) can be performed by analogy to the reaction of polymers having a succinic anhydride moiety with primary or secondary amines.

The reaction of the polymer P1 with the succinic anhydride II is frequently performed in the presence of a suitable catalyst which promotes the reaction of the —$NH_2$ of the functional groups of the polymer P1 of formula (I) with the anhydride group of the succinic anhydride II. Suitable catalysts include alkalimetal hydroxides, such as sodium or potassium hydroxide, alkalimetal carbonates, such as sodium or potassium carbonate, tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines, such as 4-dimethylaminopyridine, tin compound catalysts, such as dibutyltindioctoate and dibutyltindilaurate. The amount of catalyst is generally from 0.01 to 2% by weight, in particular from 0.1 to 1% by weight, based on the total amount of polymer P1 and succinic anhydride II.

The reaction of the polymer P1 with the succinic anhydride II is generally performed at temperatures ranging from 40 to 220° C., preferably from 50 to 200° C. and in particular from 65 to 190° C. Reaction temperatures below 100° C. will favor the formation of moieties of the formula (IVa) while higher reaction temperatures will favour the formation of moieties of the formula (IVb). Since polymers P1 comprising more moieties of the formula (IVb) than those of formula (IVa) are preferred herein, as discussed herein below, reaction of the polymer P1 with the succinic anhydride II is preferably performed at temperatures ranging from 100 to 220° C., more preferably from 120 to 200° C. and in particular from 140 to 190° C.

The reaction of the polymer P1 with the succinic anhydride II may be performed in bulk or in solvent. Suitable solvents are those which are inert under the used reaction conditions, examples including esters, hydrocarbons and mixtures thereof. Preferably, the reaction is performed in bulk, i.e. the concentration of the reactants is at least 90% by weight, based on the weight of the reaction mixture.

The reaction of the polymer P1 with the succinic anhydride II can be carried out under reduced, normal or elevated pressure. Generally, atmospheric pressure is preferred.

The polymer material included in the composition of the present invention, which is obtainable by the reaction of the polymer P1 with the succinic anhydride II, preferably contains as a major constituent polymers, which have 1 to 10, preferably 1 to 6 or 1 to 4 and in particular is 1, 2 or 3 moieties of the formulae (IVa) or (IVb):

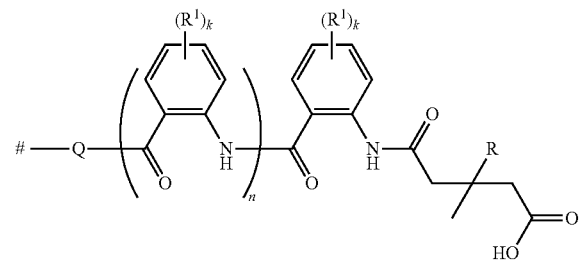

(IVa)

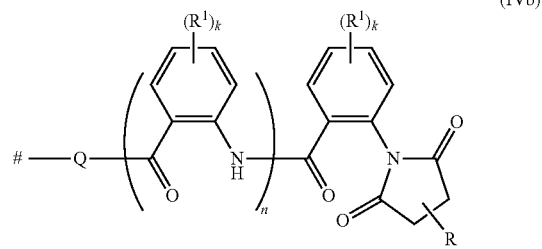

(IVb)

where k, n, Q, $R^1$ and R are as defined herein and where # indicates the point of attachment to the terminus and/or to the polymer backbone of the polymer radical P.

Preference is given to those polymer compositions, which, based on the total weight of the polymer material included in the polymer compositions, consist to at least 70% by weight, in particular to at least 90% by weight, of polymers having moieties of the formulae (IVa) or (IVb). In one group of embodiments of the invention, the polymer compositions comprise, based on the total weight of the polymers having functional moieties of the formulae (IVa) or (IVb), more than 30% by weight, in particular more than 50% by weight, especially more than 70% by weight, of polymers having functional moieties of the formula (IVa). In a preferred group of embodiments of the invention, the polymer compositions comprise, based on the total weight of the polymers having functional moieties of the formulae (IVa) or (IVb), more than 50% by weight, in particular more than 70% by weight, especially more than 90% by weight, of polymers having functional moieties of the formula (IVb).

According to a particularly preferred group of embodiments of the invention, the polymer compositions comprise, based on the total weight of the polymers having functional moieties of the formulae (IVa) or (IVb), more than 75% by weight, preferably more than 85% by weight and in particular more than 95% by weight, of polymers having functional moieties of the formula (IVb). Polymer compositions comprising polymers with a much larger share of functional moieties of the formula (IVb) than of formula (IVa) are preferred because they have been shown to be more effective thickeners in aqueous compositions, such as water-borne coating compositions.

With regard to their capability of acting as a viscosity modifiers for aqueous compositions and in particular as thickeners in water-borne coating compositions, preference is given to polymer compositions of the present invention, which are characterized by an acid number in the range from 0 to 300 mg KOH per gram of the polymer composition, in particular from 0 to 100 mg KOH per gram of the polymer composition. Particular preference is given to polymer compositions of the present invention which are characterized by an acid number in the range from 0 to 10 mg KOH per gram of the polymer composition, in particular from 0 to 5 mg KOH per gram of the polymer composition.

Polymers P1 and methods for their preparation are known from WO 2013/124830, to which full reference is made. Polymers P1, which are aliphatic polyethers, in particular poly(alkylene oxides) are also known from U.S. Pat. Nos. 4,180,644, 4,191,706, 4,191,835, 4,247,677, 4,260,729 and US 2003212291.

Apart from that, polymers P1 can be obtained by reacting a polymer of the formula (III)

$$P-(Q-H)_p \quad (III)$$

with a compound of the formulae (V) or (VI)

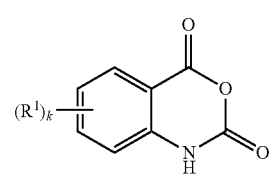

(V)

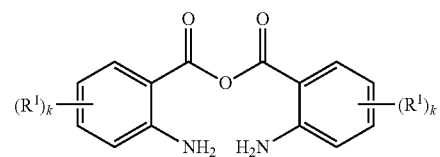

(VI)

wherein p, P, Q, k and $R^1$ are as defined herein and in particular have the meanings mentioned herein as preferred, and wherein the functional moieties -Q-H of the polymer of formula (III) are attached to the termini and/or to the backbone of the polymer radical P.

Examples of suitable compounds of the formula (V) are isatoic anhydride, fluoroisatoic anhydride, chloroisatoic anhydride, bromoisatoic anhydride, nitroisatoic anhydride, methoxyisatoic anhydride, 3-(methylsulfonyl)isatoic anhydride, (4-pyridinyl)isatoic anhydride and isatoic anhydride carboxylic acid methyl ester.

An example of a suitable compound of the formula (VI) is isatoic acid anhydride (anhydride of anthranilic acid).

Polymers P1 may also be prepared by reacting a polymer of the formula (III) with a anthranilic acid or an ester thereof of the formula (VII)

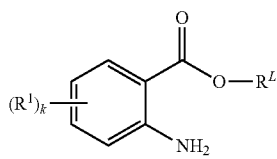

(VII)

wherein p, P, Q, k and $R^1$ are as defined herein and in particular have the meanings mentioned herein as preferred, wherein the functional moieties -Q-H of the polymer of formula (III) are attached to the termini and/or to the backbone of the polymer radical P, and wherein $R^L$ is hydrogen or a hydrocarbon radical having 1 to 8 carbon atoms such as $C_1$-$C_6$-alkyl, phenyl, $C_3$-$C_6$-cycloalkyl or benzyl and wherein $R^L$ is preferably hydrogen or $C_1$-$C_4$-alkyl, especially hydrogen, methyl or ethyl.

The polymer of the formula (III) forms the backbone of the polymer P1. Hence, the polymer III is preferably selected from the group consisting of polyethers, in particular poly-$C_2$-$C_4$-alkylene oxides, and polyetheresters, in particular aliphatic polyetheresters having at least one aliphatic polyester block and at least one aliphatic polyether block such as a poly-$C_2$-$C_6$-alkylene oxide moiety.

The reaction of the polymer of the formula (III) with the compound of formulae (V), (VI) or (VII) is generally performed in the presence of a suitable catalyst which promotes the reaction of the groups -Q-H with the carbonyl groups in compounds V, VI or VII. Suitable catalysts include alkalimetal hydroxides, such as sodium or potassium hydroxide, alkalimetal carbonates, such as sodium or potassium carbonate, tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines such as 4-dimethylaminopyridine, tin compound catalysts, such as dibutyltindioctoate and dibutyltindilaurate.

The amount of catalyst is generally from 0.01 to 2% by weight, in particular from 0.1 to 1% by weight, based on the total amount of polymer of formula (III) and the compound of formulae (V), (VI) or (VII).

The reaction of the polymer of the formula (III) with the compound of formulae (V), (VI) or (VII) is generally performed at temperatures ranging from 60 to 180° C., in particular from 70 to 150° C.

The reaction of the polymer of the formula (III) with the compound of formulae (V), (VI) or (VII) may be performed in bulk or in solvent. Suitable solvents are those with are inert under reaction conditions, examples including esters, hydrocarbons and mixtures thereof. Preferably, the reaction is performed in bulk, i.e. the concentration of the reactants is at least 90% by weight, based on the weight of the reaction mixture.

The polymers P1 may be isolated from the reaction mixture obtained from the reaction of polymer of the formula (III) with the compounds of formulae (V), (VI) or (VII). It is, however, also possible to prepare the polymer P1 in a first step and then react the thus obtained reaction product with the succinic anhydride of the formula (II) without a prior purification or isolation step.

Succinic anhydrides of the formula (II) are well known in the art and many of them are commercially available. They are obtainable, for example, by ene-reaction between maleic anhydride and an unsaturated molecule, such as an alpha-olefin (see e.g. U.S. Pat. No. 4,581,464).

As pointed out above, the polymer compositions, which include polymer material obtainable by reacting the polymer P1 with a succinic anhydride of the formula (II), are particularly suitable as viscosity modifiers for aqueous compositions and, in particular, as thickeners in water-borne coating compositions.

According to a particular embodiment of the present invention the polymer compositions according to the invention further contain, besides polymer material that is obtainable by reacting the polymer P1 with a succinic anhydride of the formula (II), a non-ionic surfactant. The term surfactant refers to surface-active substances. The purpose of the surfactants is to reduce the surface tension in an aqueous dispersion between the aqueous phase and the disperse phase and thereby to stabilize the particles of the disperse phase. The skilled worker is familiar with suitable surfactants for formulating microemulsions, for example through McCutcheon, Detergents and Emulsifiers, Int. Ed., Ridgewood, N.Y. The non-ionic surfactants may be polymeric or non-polymeric surfactants. Preferably, the predominant portion, in particular at least 90% and specifically all of the surfactants present in the polymer composition of the invention, is selected from the group of the non-polymeric surfactants, which are also referred to as emulsifiers. Usually, non-polymeric surfactants (emulsifiers) have an average molecular weight of less than 9000 Daltons, in particular from 150 to 6000 Daltons and preferably from 200 to 3000 Daltons.

The group of the non-ionic surfactants includes in particular:

homo- and copolymers of $C_2$-$C_4$-alkylene oxides, in particular homopolymers of ethylene oxide, copolymers of ethylene oxide with $C_3$-$C_4$-alkylene oxides, in particular ethylene oxide/propylene oxide copolymers; in this context the term "homo- and copolymer" also comprises oligomeric substances having in general at least 5 repeat units;

compounds of the formula

in which m denotes the average number of repeat units [OA] in the range of from 2 to 50, each A in each case independently is ethanediyl, propane-1,2-diyl, butane-1,2-diyl or 2-methylpropane-1,2-diyl, R' is straight-chain or branched $C_4$-$C_{24}$-alkyl or $C_4$-$C_{24}$-alkenyl, and R" is H, $C_1$-$C_8$-alkyl, CHO or $C_1$-$C_8$-alkylcarbonyl.

Examples of these are oligo($C_2$-$C_4$-alkylene oxide)-$C_4$-$C_{22}$-alkyl ethers, in particular ethoxylates and ethoxylate-co-propoxylates of the straight-chain and branched $C_4$-$C_{22}$-alkanols, preferably ethoxylates and ethoxylate-co-propoxylates of the fatty alcohols and ethoxylates of the oxo alcohols, such as, for example, octanol ethoxylate, lauryl alcohol ethoxylate, isotridecanol ethoxylate, cetyl alcohol ethoxylate, stearyl alcohol ethoxylate and their esters, such as, for example, the acetates;

oligo($C_2$-$C_3$-alkylene oxide)-aryl ethers and oligo($C_2$-$C_4$-alkylene oxide)-$C_1$-$C_{22}$-alkylaryl ethers, such as, for example, oligo($C_2$-$C_3$-alkylene oxide)-$C_1$-$C_{16}$-alkylbenzene ethers, in particular ethoxylates of the $C_1$-$C_{22}$-alkylphenols such as, for example, the ethoxylate of nonylphenol, decylphenol, isodecylphenol, dodecylphenol or isotridecylphenol;

oligo($C_2$-$C_3$-alkylene oxide)-mono-, -di- or -tristyrylphenyl ethers, in particular ethoxylates of the mono-, di- and tristyrylphenols, and their condensates with formaldehyde and their esters, such as, for example, the acetates;

$C_6$-$C_{22}$-alkylglucosides and $C_6$-$C_{22}$-alkyloligoglucosides; ethoxylates of the $C_6$-$C_{22}$-alkylglucosides and ethoxylates of the $C_6$-$C_{22}$-alkyloligoglucosides;

ethoxylates of the fatty acids and ethoxylates of the hydroxyl fatty acids;

partial esters of polyols with $C_6$-$C_{22}$-alkanoic acids, in particular mono- and diesters of glycerol and mono-, di- and triesters of sorbitan, such as, for example, glycerol monostearate, sorbitan monododecanoate, sorbitan dioleate and sorbitan tristearate;

ethoxylates of the partial esters of polyols with $C_6$-$C_{22}$-alkanoic acids, in particular ethoxylates of the mono- and diesters of glycerol and ethoxylates of the mono-, di- and triesters of sorbitan, such as, for example, ethoxylates of glycerol monostearate, ethoxylates of sorbitan monooleate, ethoxylates of sorbitan monostearate and ethoxylates of sorbitan tristearate;

ethoxylates of vegetable oils or animal fats, such as, for example, corn oil ethoxylate, castor oil ethoxylate, tall oil ethoxylate;

acetylene glycols such as, for example, 2,4,7,9-tetramethyl-4,7-dihydroxy-5-decine;

ethylene oxide/propylene oxide block copolymers; and ethoxylates of fatty amines or of fatty acid diethanolamides.

The term oligo($C_2$-$C_4$-alkylene oxide) ether or oligo-$C_2$-$C_4$-alkylene oxide refers to oligoether radicals which are derived from $C_2$-$C_4$-alkylene oxides such as ethylene oxide, propylene oxide (=1-methyloxirane), 1,2-butylene oxide (=1-ethyloxirane) and 2-methylpropylene oxide (=1,1-dimethyloxirane). Accordingly, the term oligo-$C_2$-$C_3$-alkylene oxide ether refers to oligoether radicals which are derived from $C_2$-$C_3$-alkylene oxides such as ethylene oxide and propylene oxide. The term ethoxylate refers to oligoether radicals which are derived from ethylene oxide. Analogously, the term oligoethylene oxide co-oligopropylene oxide refers to polyether radicals which are derived from mixtures of ethylene oxide and propylene oxide. The number of repeat units in the oligoether radicals is generally between 2 and 120, frequently between 2 and 50, and in particular between 2 and 20.

Among the abovementioned non-ionic surfactants, the following are preferred:

homo- or copolymers of the $C_2$-$C_3$-alkylene oxides;
compounds of the formula I:

R'—[OA]$_m$—OR"    (I), in which m denotes the average number of repeat units [OA] in the range of from 2 to 50, each A in each case independently is ethanediyl, propane-1,2-diyl, butane-1,2-diyl or 2-methylpropane-1,2-diyl, R' is straight-chain or branched $C_4$-$C_{24}$-alkyl or $C_4$-$C_{24}$-alkenyl, and R" is H, $C_1$-$C_8$-alkyl, CHO or $C_1$-$C_8$-alkylcarbonyl;
oligo($C_2$-$C_3$-alkylene oxide)-$C_1$-$C_{16}$-alkylbenzene ethers;
oligo($C_2$-$C_3$-alkylene oxide)-mono-, -di- or -tristyrylphenyl ethers;
partial esters of glycerol or sorbitan with fatty acids; and
ethoxylates of monofatty acid esters of sorbitan,
and also mixtures of the non-ionic surfactants mentioned hereinabove.

Non-ionic surfactants which are particularly preferred in the context of the present invention include ethoxylates and ethoxylate-co-propoxylates of the straight-chain and branched $C_4$-$C_{22}$-alkanols, ethylene oxide/propylene oxide block copolymers, oligo($C_2$-$C_3$-alkylene oxide)-$C_1$-$C_{16}$-alkylbenzene ethers, ethoxylated sorbitan monofatty acid esters and mono-, di- or tristyrylphenol ethoxylates, and mixtures of these.

In a particular embodiment of the present invention the polymer compositions according to the invention contain a non-ionic surfactant that is selected from ethoxylates and ethoxylate-co-propoxylates of the straight-chain and branched $C_4$-$C_{22}$-alkanols, in particular from ethoxylates of $C_6$-$C_{20}$-alkanols, especially of straight-chain $C_6$-$C_{20}$-alkanols, wherein the ethoxylate moieties have from 2 to 30, in particular from 2 to 15 ethylene oxide repeating units.

The weight ratio of the polymer material obtained from the reaction of polymer P1 with a succinic anhydride of the formula (II) and the non-ionic surfactant, if present, is usually in the range from 1:10 to 20:1, preferably in the range from 1:5 to 10:1, in particular in the range from 1:2 to 7:1 and especially in the range from 1:1 to 5:1.

In a preferred embodiment of the invention the polymer composition includes water, wherein all or at least the predominant amount, i.e. at least 90% by weight, preferably at least 95% by weight and in particular at least 98% by weight, of the total polymer material contained in the polymer composition is typically present in the composition in the form of an aqueous dispersion, in the form of an aqueous solution or a mixture thereof. The amount of water included in the polymer composition is generally from 1 to 50% by weight, in particular from 10 to 40% by weight, based on the total amount of the polymer composition.

In a particular preferred embodiment of the invention the polymer composition according to the present invention is in the form of an aqueous solution of the polymer material.

The polymer material contained in the polymer composition of the present invention may have carboxyl groups, which can be neutralized. Therefore, the polymer composition of the present invention can be used in their acidic form or in a neutralized form, rendering the acidic polymer constituents of the polymer composition, if present, into their corresponding salts. Suitable salts are base addition salts resulting from the partial or complete neutralization of the acidic polymer constituents with organic or inorganic bases. Preferably, the degree of neutralization is in the range of from 5 to 100%.

Examples of suitable organic bases for the partial or complete neutralization of the polymer P include alkylamines, such as monoalkylamines, for example ethylamine, dialkylamines, for example diisopropylamine, trialkylamines, for example triethylamine, diisopropylethylamine or tributylamine, as well as alkanolamines, such as monoalkanolamines, for example ethanolamine or 2-amino-2-methyl-1-propanol, N,N-dialkylalkanol amines, for example N, N-dimethylethanolamine or N,N-dimethylaminomethylpropanol, dialkanolamines, for example diethanolamine and trialkanolamines, for example triethanolamine. Preferred organic bases are 2-amino-2-methyl-1-propanol, ethanolamine, triethylamine and tributylamine.

Examples of suitable inorganic bases for the partial or complete neutralization of the polymers contained in the polymer compositions are alkali metal or alkaline earth metal hydroxides, for example sodium, potassium, lithium or calcium hydroxide, alkali metal or alkaline earth metal carbonates, for example sodium, potassium or calcium carbonate, and ammonia. Preferred inorganic bases are sodium hydroxide, potassium hydroxide, lithium hydroxide and ammonia.

In a further preferred embodiment of the invention the polymer composition has a pH in the range from 5.0 to 10.0, preferably in the range from 6.0 to 9.0 and in particular in the range from 7.0 to 9.0.

The polymer compositions according to the invention can be used as additives, such as preferably viscosity modifiers and in particular thickeners, in a broad range of application fields, e.g. coatings, personal care items, detergents, adhesives, sealants, agricultural formulations and petroleum drilling fluids. The polymer compositions of the present invention are particularly suitable as viscosity modifiers in water-based systems, such as aqueous compositions. The polymer compositions of the invention are especially suitable as additives, in particular as thickeners, in latex-based coating compositions that preferably comprise a polymer P2 in the form of a polymer latex and more preferably in addition comprise a fine particulate solid material selected from pigments and fillers. Examples of such latex-based coating compositions are a variety of latex paints useful for a multitude of applications including interior and exterior coating applications and flat, semi-gloss and gloss applications for, e.g., industrial coatings.

Accordingly, the invention relates to aqueous compositions containing a polymer composition of the invention, which comprises as viscosity modifier a polymer material that is obtainable by reacting the polymer P1 with the succinic anhydride of the formula (II).

The invention in particular also relates to water-borne coating compositions which comprise the polymer composition of the invention as defined herein and, in addition, a polymer P2 in the form of a polymer latex.

The invention in particular also relates to water-borne coating compositions which comprise the polymer composition of the invention as defined herein and, in addition, a polymer P2 in the form of a polymer latex and a fine particulate solid material which are preferably selected from the group consisting of pigments and fillers. The fine particulate solid materials are present in the coating compositions in dispersed form.

The aforementioned coating compositions contain the polymer compositions in such an amount that the polymer material of the polymer compositions is from 0.05 to 10% by weight, preferably 0.1 to 5% by weight, in particular 0.15 to 3% by weight and especially 0.2 to 2% by weight, based on the polymer P2. As additive in such coating compositions the polymer compositions typically act as viscosity modifiers and in particular as thickeners.

The aforementioned coating compositions contain the fine particulate solid materials, if present, in an amount of from 1 to 90% by weight, preferably 1 to 60% by weight, in particular 1.5 to 50% by weight and especially 2 to 25% by weight, based on the polymer P2.

Polymer latices are familiar to the skilled person and are typically prepared in the form of an aqueous polymer dispersion by free-radically initiated aqueous emulsion polymerization of ethylenically unsaturated monomers. This method has been widely described before now and is therefore sufficiently well known to the skilled person (see, for example, Encyclopedia of Polymer Science and Engineering, vol. 8, pages 659 to 677, John Wiley & Sons, Inc., 1987; D. C. Blackley, Emulsion Polymerisation, pages 155 to 465, Applied Science Publishers, Ltd., Essex, 1975; D. C Blackley, Polymer Latices, 2nd Edition, vol. 1, pages 33 to 415, Chapman & Hall, 1997; H. Warson, The Applications of Synthetic Resin Emulsions, pages 49 to 244, Ernest Benn, Ltd., London, 1972; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969, and patent specification DE-A 40 03 422). The free-radically initiated aqueous emulsion polymerization is typically accomplished by dispersing the ethylenically unsaturated monomers in the aqueous medium, generally using dispersing assistants, such as emulsifiers and/or protective colloids, and polymerizing them by means of at least one water-soluble free-radical polymerization initiator. Frequently, in the aqueous polymer dispersions obtained, the residual amounts of unreacted ethylenically unsaturated monomers are lowered by chemical and/or physical methods that are likewise known to the skilled person (see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115), the polymer solids content is adjusted to a desired level by dilution or concentration, or other customary additives, such as bactericidal, foam-modifying or viscosity-modifying additives, are added to the aqueous polymer dispersion.

In addition to these so-called primary aqueous polymer dispersions, the skilled person is also aware of so-called secondary aqueous polymer dispersions. By these are meant those aqueous polymer dispersions in whose preparation the polymer is produced outside of the aqueous dispersion medium, being located, for example, in solution in a suitable non-aqueous solvent. This solution is then transferred into the aqueous dispersion medium, and the solvent is separated off, generally by distillation, while dispersion takes place.

In the context of the present invention those polymer latices in the form of an aqueous dispersion are preferred that comprise in copolymerized form:

50% to 99.9% by weight of ester of acrylic and/or methacrylic acid with alkanols containing 1 to 12 C atoms and/or styrene, or 50% to 99.9% by weight of styrene and/or butadiene, or 50% to 99.9% by weight of vinyl chloride and/or vinylidene chloride, or 50% to 99.9% by weight of vinyl acetate, vinyl propionate, vinyl esters of Versatic acids, vinyl esters of long-chain fatty acids and/or ethylene.

In the context of the present invention those polymer latices in the form of an aqueous dispersion are particularly preferred that comprise in copolymerized form:

0.1% to 5% by weight of at least one α,β-monoethylenically unsaturated monocarboxylic and/or dicarboxylic acid containing 3 to 6 C atoms, and/or amide thereof, and 50% to 99.9% by weight of at least one ester of acrylic and/or methacrylic acid with alkanols containing 1 to 12 C atoms and/or styrene, or 0.1% to 5% by weight of at least one α,β-monoethylenically unsaturated monocarboxylic and/or dicarboxylic acid containing 3 to 6 C atoms, and/or amide thereof, and 50% to 99.9% by weight of styrene and/or butadiene, or 0.1% to 5% by weight of at least one α,β-monoethylenically unsaturated monocarboxylic and/or dicarboxylic acid containing 3 to 6 C atoms, and/or amide thereof, and 50% to 99.9% by weight of vinyl chloride and/or vinylidene chloride, or 0.1% to 5% by weight of at least one α,β-monoethylenically unsaturated monocarboxylic and/or dicarboxylic acid containing 3 to 6 C atoms, and/or amide thereof, and 50% to 99.9% by weight of vinyl acetate, vinyl propionate, vinyl esters of Versatic acids, vinyl esters of long-chain fatty acids and/or ethylene.

In the context of the present invention the use of those polymer latices in the form of an aqueous dispersion is preferred whose glass transition temperatures (Tg) are ≥−50 and ≤100° C., more particularly ≥−30 and ≤60° C., and especially ≥0 and ≤50° C. The glass transition temperature is determined by the DSC method (Differential Scanning Calorimetry, 20 K/min, midpoint measurement, DIN 53 765).

According to Fox (T. G. Fox, Bull. Am. Phys. Soc. 1956 [Ser. II], 1, page 123 and in accordance with Ullmann's Encyclopadie der technischen Chemie, vol. 19, page 18, 4th edition, Verlag Chemie, Weinheim, 1980) the glass transition temperature of copolymers with no or only low degrees of crosslinking is given in good approximation by:

$$1/Tg = x1/Tg1 + x2/Tg2 + \ldots xn/Tgn,$$

where $x1, x2, \ldots xn$ are the mass fractions of the monomers $1, 2, \ldots n$ and $Tg1, Tg2, \ldots Tgn$ are the glass transition temperatures in degrees Kelvin of the homopolymers constructed in each case only from one of the monomers $1, 2, \ldots n$. The Tg values for the homopolymers of the majority of monomers are known and are listed for example in Ullmann's Encyclopedia of Industrial Chemistry, 5$^{th}$ edition, vol. A21, page 169, Verlag Chemie, Weinheim, 1992; other sources of homopolymer glass transition temperatures are constituted for example by J. Brandrup, E. H. Immergut, Polymer Handbook, 1st Ed., J. Wiley, New York, 1966; 2nd Ed. J. Wiley, New York, 1975 and 3rd Ed. J. Wiley, New York, 1989.

The average diameter of the particles that are present in the aqueous dispersion of the polymer latex of the invention is generally in the range from 10 to 1000 nm, often 50 to 500 nm or 80 to 300 nm. Furthermore, the solids contents of the polymer latex of the present invention are generally ≥10% and ≤70% by weight, preferably ≥30% to ≤70% by weight, and in particular ≥40% to ≤60% by weight, based on the total weight of the polymer latex.

Solid fine particular materials that are suitable for the compositions of the present invention include but are not limited to the group consisting of pigments and fillers. Pigments may be inorganic or organic. Pigments include colored pigments and pearlescents.

The size of the fine particulate material is preferably in the micrometer range, e.g. the weight average particle diameter may range from 1 μm to 2000 μm, in particular form 2 μm to 1000 μm or from 5 μm to 500 μm. The weight average particle diameter may be determined by sieving analysis. The weight average particle diameter may be also be determined by light scattering methods.

Examples of suitable organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthanthrones, isoviolanthrones, diketopyrrolopyrrole, and carbazoles, e.g. carbazole violet, and the like.

Further examples of organic pigments can be found in the monograph: W. Herbst, K. Hunger "Industrielle Organische Pigmente" 2$^{nd}$ Edition, 1995, VCH Verlagsgesellschaft, ISBN: 3-527-28744-2.

Examples of suitable inorganic pigments are e.g. metallic flakes, such aluminium, aluminium oxide, calcium carbonate, silicon oxide and silicates, iron(III)oxide, chromium(III) oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

Suitable fillers are calcium carbonate, silicates, glass fibres, glass beads, talc, kaolin, mica, barium sulphate, metal oxides and hydroxides, carbon black, graphite, wood powders, powders and fibres of other natural products, synthetic fibres.

Preferably, the weight ratio of fine particulate solid material to the polymer latex included in the water-borne coating composition of the invention may range from 120:1 to 1:40, in particular from 35:1 to 1:5.

In a particular embodiment of the invention, the water-borne coating composition comprises
i) 1 to 70% by weight, frequently 2 to 60% by weight, in particular 3 to 50% by weight, based on the total weight of the coating composition, of at least one fine particulate solid material, selected from the group consisting of pigments and fillers;
ii) 5 to 40% by weight, frequently 10 to 40% by weight, in particular from 15 to 38% by weight, based on the total weight of the coating composition, of at least one polymer P2 in the form of a polymer latex as defined herein and calculated as solid polymer P2;
iii) 0.01 to 3% by weight, frequently 0.1 to 2% by weight, in particular 0.2 to 1.5% by weight, based on the total weight of the coating composition, of a polymer composition of the invention, calculated as polymer material that is defined herein;
iv) 20 to 93% by weight, frequently 30 to 85% by weight, in particular from 40 to 75% by weight, based on the total weight of the coating composition, of water.

Depending on the intended use, the water-borne coating composition may further comprise one or more conventional additives. Conventional additives included e.g. binders, emulsifiers, further rheology additives, flow auxiliaries, pigment dispersants, other dispersants, optical brighteners, defoamers, film-forming assistants, organic solvents, flame retardants, preservatives, antistatic agents or blowing agents.

For preparing the water-borne coating composition of the invention the fine particulate solid material, if desired to be included in the composition, is typically mixed with the polymer latex, so that the fine particulate solid material is dispersed in the aqueous phase. The polymer composition of the invention and the above-discussed additives can be added in any desired, appropriate order to the polymer latex, to the fine particulate solid material or to a combination thereof. In a preferred embodiment of the invention, the fine particulate solid material, if desired, is first mixed with the polymer latex and only then the polymer composition of the invention and possible also further additive are added in any desired, appropriate order.

The water-borne coating composition of the present invention can be applied to any of a wide variety of materials, such as, for example, paper, wood, concrete, metal, glass, ceramic, plastics, plaster, and roofing substrates such as asphalt coatings, roofing felts or polyurethane foam insulations; or to preliminarily coated, primed, undercoated, worn or weathered substrates. The aqueous coating composition of the invention can be applied to the materials by a variety of techniques which are well known per se, such as spreading, brushing, rolling, air-assisted spraying or airless spraying, electrostatic spraying and the like, for example.

The invention is hereinafter also described by way of examples.

PREPARATION EXAMPLES

TABLE 1

Commercially available products that were used as a polymer of the formula (III), a non-ionic surfactant and a polymer P2 in the form of a polymer latex:

| Name | Composition | Supplier |
| --- | --- | --- |
| Pluriol ® E8000 | polyethylene glycol, average molecular mass $M_N$ approx. 8000 g/mol; used as polymer of formula (III). | BASF SE |
| Dehydol ® O4 | C8-fatty alcohol ethoxylated with 4 EO units; used as non-ionic surfactant. | BASF SE |
| Acronal ® Plus 4670 | Acrylic latex, solid content 49-51% by weight, particle size approx. 140 nm; used as polymer P2 in the form of a polymer latex. | BASF SE |

Preparation of Polymer P1-a:

A mixture of 80.0 g (0.02 mol of hydroxyl groups) Pluriol® E8000, 4.1 g (0.025 mol) isatoic anhydride (IA), and 0.25 g (0.3% by weight) 1,4-diazabicyclo[2.2.2]octan was heated at 80 to 140° C. until no more carbon dioxide was evolved. The obtained product was a solid with an amine number of 15 mg KOH/g.

Preparation of Polymer Compositions Useful as Thickeners

Example 1 (According to the Invention)

A mixture of 41.0 g (0.005 mol) polymer P1-a and 4.0 g (0.015 mol) (2-Dodecen-1-yl)succinic anhydride was heated at 80° C. for 10 hours under nitrogen gas. Afterwards 22 g Dehydol® O4 and 158 g water were added. The resulting product was a viscous water solution including the obtained polymer material in a concentration of 20% by weight.

Example 2 (According to the Invention)

A mixture of 41.0 g (0.005 mol) polymer P1-a and 4.0 g (0.015 mol) (2-Dodecen-1-yl)-succinic anhydride was heated at 180° C. for 10 hours under nitrogen gas. Afterwards 22 g Dehydol® O4 and 158 g water were added. The resulting product was a viscous water solution including the obtained polymer material in a concentration of 20% by weight.

Example 3 (According to the Invention)

A mixture of 41.0 g (0.005 mol) polymer P1-a and 6.7 g (0.025 mol) (2-Dodecen-1-yl)-succinic anhydride was heated at 180° C. for 10 hours under nitrogen gas. Afterwards 23 g Dehydol® O4 and 165 g water were added. The resulting product was a viscous water solution including the obtained polymer material in a concentration of 20% by weight.

Example 4 (According to the Invention)

A mixture of 41.0 g (0.005 mol) polymer P1-a, 3.4 g (0.015 mol) of (2-Nonen-1-yl)-succinic anhydride was heated at 180° C. for 10 hours under nitrogen gas. Afterwards 22 g Dehydol® O4 and 154 g water were added. The resulting product was a viscous water solution including the obtained polymer material in a concentration of 20% by weight.

Example 5 (Comparative)

A mixture of 40.0 g (0.005 mol) Pluriol® E8000 and 4.0 g (0.015 mol) (2-Dodecen-1-yl)succinic anhydride was heated at 80° C. for 10 hours under nitrogen gas. Afterwards 22 g Dehydol® O4 and 154 g water were added. The resulting product was a viscous water solution including the obtained modified polyethylene glycol in a concentration of 20% by weight.

Example 6 (Comparative)

First, 44.0 g polymer P1-a was heated at 80° C. and then 22 g Dehydol® O4 and 154 g water were added. The resulting product was a viscous water solution with a concentration of 20% by weight.

Example 7 (According to the Invention)

A mixture of 41.0 g (0.005 mol) polymer P1-a, 5.3 g (0.015 mol) Octadecenylsuccinic anhydride was heated at 180° C. for 10 hours under nitrogen gas. Afterwards 23 g Dehydol® O4 and 161 g water were added. The resulting product was a viscous water solution including the obtained polymer material in a concentration of 20% by weight.

Example 8 (According to the Invention)

A mixture of 20.0 g (0.005 mol) Pluriol® E4000, 80 g Pluriol® E8000 (0.01 mol), 6.1 g (0.037 mol) isatoic anhydride (IA), and 0.3 g 1,4-diazabicyclo[2.2.2]octan was heated at 80 to 140° C. until no more carbon dioxide was evolved. Then, the material was cooled down to 80° C. and 20 g (2-Dodecen-1-yl)-succinic anhydride was added. The mixture was kept at 180° C. for 10 hours under nitrogen gas and afterwards 53 g Dehydol® O4 and 424 g water were added. The resulting product was a viscous water solution including the obtained polymer material in a concentration of 20% by weight.

Performance Testing

In order to test the thickening effect of the thickeners obtained in examples P1-a and 1 to 8, water-borne coating compositions were prepared by mixing 4.0 g of each of the above thickeners, 26 g water, and 70 g Acronal® Plus 4670. The mixtures were homogenized with the laboratory dissolver Dispermat® (VMA Getzmann GmbH) at 1500 rpm for 10 minutes and, after a standing time of at least 20 hours, slightly stirred with a wooden spatula. Afterwards the viscosities of the obtained homogenates were measured at shear rates in the range of 0.1 to 10000 sec$^{-1}$ using the cone-plate viscometer Haake RC20 CPS P with cone C50-1. The results are summarized in Table 2.

TABLE 2

Rheological behavior of coating compositions

| Example | \multicolumn{7}{c}{Viscosity (mPas) at shear rates [sec$^{-1}$] of} |
|---|---|---|---|---|---|---|---|
|  | 0.1 | 0.5 | 1 | 10 | 100 | 1000 | 10000 |
| P1-a (comparative) | 75 | 40 | 25 | 15 | 15 | 10 | 10 |
| 1 | 420 | 420 | 420 | 400 | 380 | 230 | 80 |
| 2 | 550 | 560 | 550 | 530 | 490 | 300 | 120 |
| 3 | 520 | 520 | 500 | 450 | 410 | 250 | 90 |
| 4 | 80 | 120 | 150 | 150 | 120 | 90 | 60 |
| 5 (comparative) | 60 | 100 | 110 | 100 | 90 | 70 | 50 |
| 6 (comparative) | 75 | 40 | 25 | 15 | 15 | 10 | 10 |
| 7 | 1500 | 1450 | 1200 | 1000 | 750 | 90 | 40 |
| 8 | 850 | 840 | 840 | 820 | 780 | 400 | 70 |

It can be seen from Table 2 that all six thickeners of examples 1 to 4, 7, and 8 that are in accordance to the present invention impart substantially higher viscosities to water-borne coating compositions than the comparative thickeners of examples P1-a, 5, and 6 which differs from the thickeners of the examples according to the invention in that it lacks anthranilate groups. As can also be seen from Table 2 this beneficial effect is present in all cases over the broad range of shear rates measured.

We claim:

1. A polymer composition comprising a polymer material which is prepared by reacting
a) a polymer P1 of the formula (I):

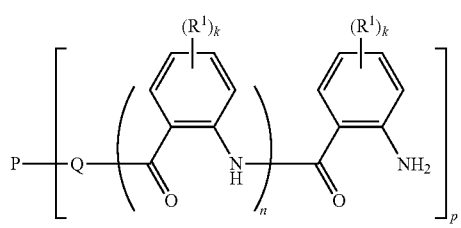

with
b) a succinic anhydride of the formula (II):

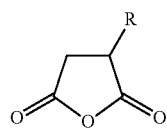

to obtain a polymer composition comprising at least one of polymers of formulae (IVa) and (IVb):

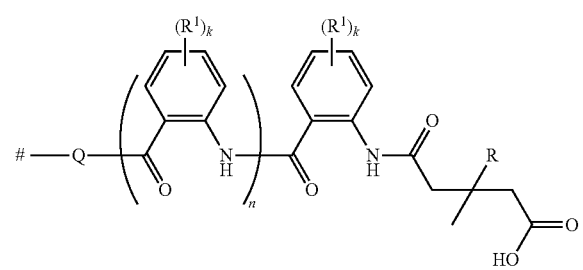

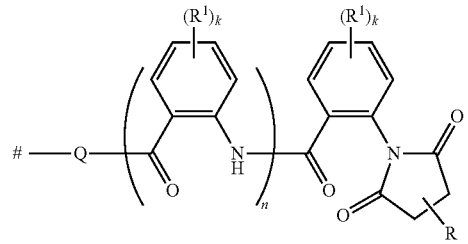

wherein
k is an integer from 0 to 4;
n is 0 or 1
p is an integer from 1 to 10, wherein a number average of p is from 1.5 to 10;
Q is a divalent moiety selected from the group consisting of —O— and —NH—;
P is a p-valent hydrophilic neutral polymer radical;
$R^1$ is independently selected from the group consisting of halogen, COOCH$_3$, —N(C$_1$-C$_6$-alkyl)$_2$, —NO$_2$, —S(=O)$_2$R$^2$, C$_1$-C$_4$-alkyl, C$_1$-C$_4$-alkoxy, aryloxy, aryl, heteroaryl, where aryl, hetaryl and aryloxy are unsubstituted or substituted by 1, 2, 3 or 4 radicals selected from the group consisting of —OH, —COOCH$_3$, —N(C$_1$-C$_6$-alkyl)$_2$, —NO$_2$, —S(=O)$_2$R$^2$, C$_1$-C$_4$-alkyl, C$_1$-C$_4$-alkoxy and halogen;
$R^2$ is selected from the group consisting of —NH$_2$, —NH(C$_1$-C$_6$-alkyl), —N(C$_1$-C$_6$-alkyl)$_2$, C$_1$-C$_4$-alkoxy, aryl and heteroaryl, where aryl and hetaryl are unsubstituted or substituted by 1, 2, 3 or 4 radicals selected from the group consisting of C$_1$-C$_4$-alkyl, C$_1$-C$_4$-alkoxy and halogen;

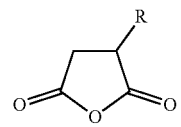

R is C$_4$-C$_{24}$-alkyl or C$_4$-C$_{24}$-alkenyl; and
# indicates the point of attachment to the terminus and/or to the polymer backbone of the polymer radical P.

2. The polymer composition as claimed in claim 1, wherein P is a p-valent polymer radical derived from a linear or branched poly-(C$_2$-C$_4$-alkylene oxide) polymer.

3. The polymer composition as claimed in claim 1, wherein P is a poly(ethylene oxide), a poly(propylene oxide) or a poly(ethylene oxide-co-propylene oxide).

4. The polymer composition as claimed in claim 1, wherein the number average of p is from 1.8 to 3.

5. The polymer composition as claimed in claim 1, wherein:
k is 0;
n is 0; and
Q is —O—.

6. The polymer composition as claimed in claim 1, wherein a number average molecular weight of the polymer radical P is from 500 to 50000 Dalton.

7. The polymer composition as claimed in claim 1, wherein R is linear C$_4$-C$_{24}$-alkyl or linear C$_4$-C$_{24}$-alkenyl.

8. The polymer composition as claimed in claim 1, wherein R is C$_6$-C$_{18}$-alkyl or C$_6$-C$_{18}$-alkenyl.

9. The polymer composition as claimed in claim 1, wherein the polymer P1 and the succinic anhydride of the formula (II) are reacted in a relative amount such that the molar ratio of —NH$_2$ groups in the polymer P1 to the anhydride groups of the succinic anhydride of formula (II) is in the range from 1:1 to 1:5.

10. The polymer composition as claimed in claim 1, wherein the polymer P1 is obtained by reacting a polymer of the formula (III):

P-(Q-H)$_p$   (III)

with a compound of the formulae (V), (VI) or (VII):

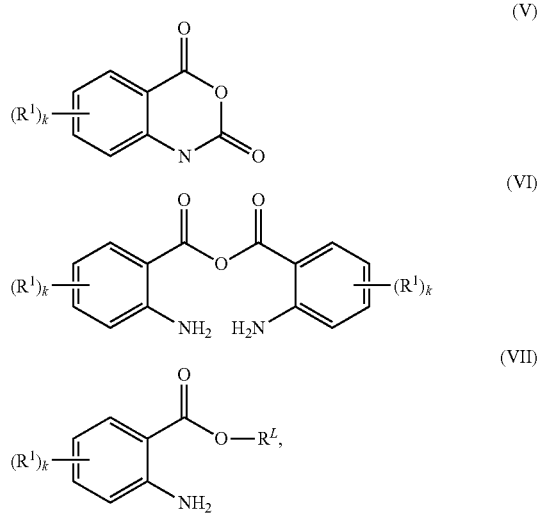

wherein p, k, P, Q and R$^1$ are as defined in claim 1, and R$^L$ is hydrogen or a hydrocarbon radical having 1 to 8 carbon atoms.

11. The polymer composition as claimed in claim 1, further comprising a non-ionic surfactant.

12. The polymer composition as claimed in claim 1, which is in the form of an aqueous solution of the polymer material.

13. The polymer composition as claimed in claim 1, which has a pH in the range from 5.0 to 10.0.

14. A process for the manufacturing of the polymer composition as claimed in claim 1, which comprises
    reacting the polymer P1 with a succinic anhydride of the formula (II).

15. A viscosity modifier comprising the polymer composition of claim 1.

16. The viscosity modifier of claim 15, wherein the polymer composition is a thickener in a water-borne coating composition.

17. A water-borne coating composition, comprising the polymer composition of claim 1 and a polymer P2 in the form of a polymer latex.

18. The coating composition of claim 17, comprising the polymer composition in such an amount that the polymer material of the polymer composition is from 0.1 to 5% by weight, based on the polymer P2.

19. The coating composition of claim 17, comprising
    i) 1 to 70% by weight, based on the total weight of the coating composition, of at least one fine particulate solid material, selected from the group consisting of pigments and fillers;
    ii) 5 to 40% by weight, based on the total weight of the coating composition, of a polymer P2 in the faun of a polymer latex and calculated as solid polymer P2;
    iii) 0.01 to 3% by weight, based on the total weight of the coating composition, of the polymer composition, calculated as polymer material; and
    iv) 20 to 93% by weight, based on the total weight of the coating composition, of water.

* * * * *

UNITED STATES PATENT AND TRADEMARK OFFICE
CERTIFICATE OF CORRECTION

PATENT NO. : 10,730,967 B2
APPLICATION NO. : 15/536525
DATED : August 4, 2020
INVENTOR(S) : Huiguang Kou et al.

It is certified that error appears in the above-identified patent and that said Letters Patent is hereby corrected as shown below:

On the Title Page

Column 1, Item (51), under "Int. Cl.", Line 11, "C09D 7/45" should read -- C08F 8/14 --.

In the Specification

Column 1, Line 55, "east" should read -- least --.

Column 20, Line 14, "rutil, anatas," should read -- rutile, anatase, --.

In the Claims

Column 24, Claim 1, Line 16, "or 1" should read -- or 1; --.

Column 24, Claim 1, Line 31, delete "$C_1$-$C_4$-" insert -- $C_1$-$C_4$-alkyl, $C_1$-$C_4$- --.

Column 26, Claim 19, Line 30, "faun" should read -- form --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*